United States Patent
Redecker et al.

[15] 3,648,166
[45] Mar. 7, 1972

[54] ELECTRICAL DEVICE HAVING CURRENT LIMITER AND SPARK GAP

[72] Inventors: Henry W. Redecker, Raleigh; William J. Zisa, Cary, both of N.C.

[73] Assignee: Westinghouse Electric Corporation, Pittsburgh, Pa.

[22] Filed: Feb. 28, 1968

[21] Appl. No.: 708,854

[52] U.S. Cl. ............................................. 324/110, 324/156
[51] Int. Cl. ................................................ G01r 1/00, G01r 1/04
[58] Field of Search ................ 324/110, 156; 317/16; 338/21

[56] References Cited

UNITED STATES PATENTS

| 2,501,322 | 3/1950 | Ferguson et al. | 338/21 |
| 2,889,494 | 6/1959 | Schmidt et al. | 324/110 X |
| 3,096,496 | 7/1963 | Burrage et al. | 338/21 |
| 3,337,802 | 8/1967 | Gill | 324/156 |

Primary Examiner—Alfred E. Smith
Attorney—A. T. Stratton and C. L. Freedman

[57] ABSTRACT

An electrical device such as a watthour meter has a movement located within an enclosure. Terminals pass through the enclosure for the purpose of establishing connections between the device and an external circuit. A spark gap is secured to the enclosure and is positioned externally of the enclosure for the purpose of establishing a shunt path to ground for surges appearing on the external circuit. A silicon carbide block is located internally of the enclosure and is connected in series with the spark gap for the purpose of limiting the current flowing through the spark gap after breakover of the gap takes place.

4 Claims, 5 Drawing Figures

Patented March 7, 1972 3,648,166
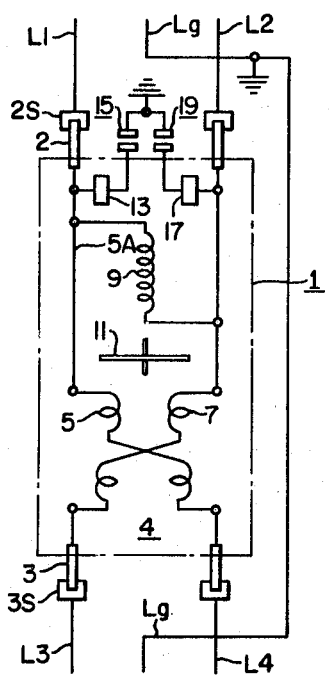
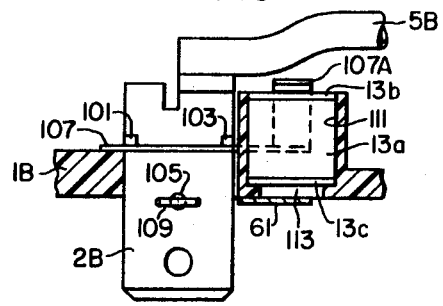
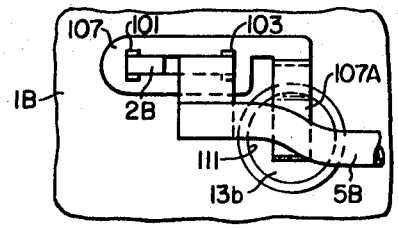
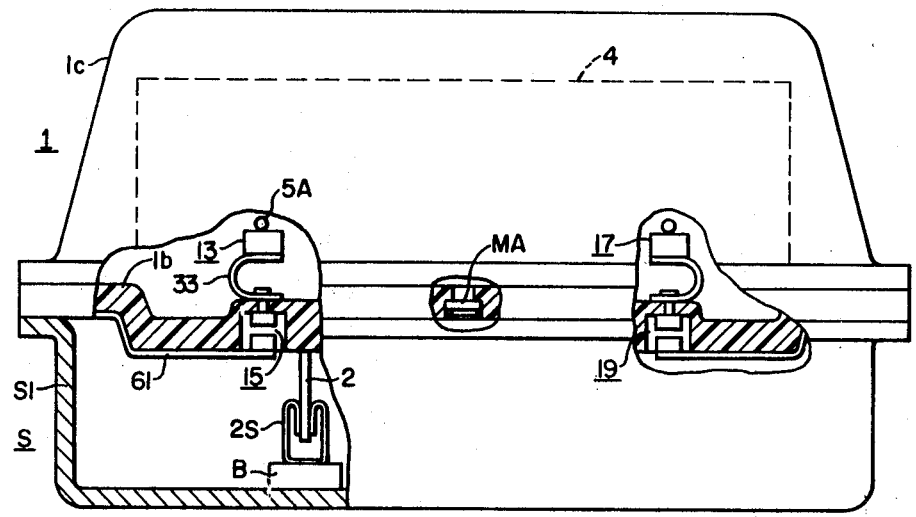
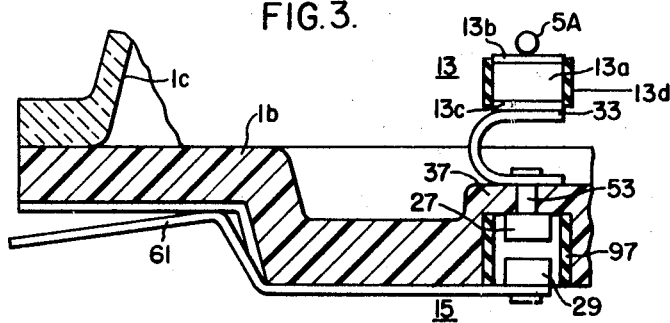
INVENTORS
Henry W. Redecker
and William J. Zisa
BY C. L. Freedman
ATTORNEY

ELECTRICAL DEVICE HAVING CURRENT LIMITER AND SPARK GAP

BACKGROUND OF THE INVENTION

This invention relates to electrical devices having built-in protection against electrical surges and it has particular relation to watthour meters which are protected against electric surges. Although aspects of the invention are applicable to various electrical devices such as measuring instruments and relays it is particularly suitable for watthour meters and will be discussed with reference to such meters.

The harmful effects of surges on watthour meters are well known in the art. Thus if a watthour meter employs a magnetic mounting a surge may result in demagnetization or cross magnetization of the magnets employed in the magnetic mounting. Demagnetization of the magnets may result in the dropping of meter rotor to an extent such that the rotor rests on the stator. Cross magnetization of the magnets employed in the meter mounting may objectionably increase the starting watts.

Surges also may result in breakdown of insulation employed in the meter and in the burning of parts of the meter.

Demagnetization of the damping magnets may result from surges. Such demagnetization results in registration errors due to insufficient damping of the meter rotor.

In an effort to protect a meter against electric surges an electroconductive shield has been positioned within the glass cover of the meter enclosure. High coercive surge-resistant bearing and damping magnets have been employed. Spark gaps have been employed for the purpose of establishing shunt paths for surge currents between the incoming line and ground. In order to interrupt power-follow current it has been proposed that fuses be connected in series with the spark gaps. It should be noted that if such a fuse blows the associated meter is left unprotected against subsequent surges. If the gaps and fuses are located within the meter enclosure the meter movement is subjected to contaminants and heat produced by breakover of the gaps and melting of the fuses. If these components are mounted separately outside of a meter they are either exposed to the environment or are provided with separate enclosures with added cost and space requirements.

Surge protection for meters is mentioned in the "Electrical Metermen's Handbook" 7th edition, published in 1965 by the Edison Electric Institute, New York City, pages 508, 512, 548, 609, 673 and 675. A spark gap protection which has proved to be very effective for meters operating at 240 volts and 120 volts is shown in the Schmidt et al. U.S. Pat. No. 2,889,494.

Because of the power-follow current which is encountered at higher voltages such as 480 volts the prior solutions have not been found satisfactory for meters operating at such higher voltages. For example if a spark gap is employed for a 480-volt meter the breakover of the spark gap may be accompanied by a power-follow current of the order of 6,000 amperes. Such a current could seriously damage the metal parts and insulation of the meter.

Attempts have been made to increase the withstand voltage of the insulation employed in meters designed for operation at 480 volts. However experience has shown that even if a potential coil of such a meter is designed to withstand a test voltage of 15,000 volts (RMS) line-to-ground the resulting meter still is not completely satisfactory for operation at the higher voltages.

At present some electric utilities employ lightning arresters mounted externally of the meter despite the added cost represented by such a solution.

SUMMARY OF THE INVENTION

In accordance with the invention a spark gap is mounted on the outside of the meter enclosure. This spark gap is connected in series with a current limiter which is located internally of the meter enclosure. The current limiter preferably is resistant to humidity and is nonemissive.

It is therefore an object of the invention to provide an electric device having improved protection against electric surges.

It is also an object of the invention to provide a watthour meter for high-voltage service which is self protected against electric surges.

BRIEF DESCRIPTION OF THE DRAWINGS

Other objects of the invention will be apparent from the following description taken in conjunction with the accompanying drawings in which:

FIG. 1 is a schematic view of a watthour meter embodying the invention;

FIG. 2 is a view in top plan with parts broken away of a watthour meter embodying the invention;

FIG. 3 is a detailed view in section showing a portion of the meter of FIG. 1;

FIG. 4 is a detail view in section showing a modified form of the invention; and FIG. 5 is a view in end elevation of the embodiment of FIG. 4.

DESCRIPTION OF THE PREFERRED EMBODIMENT

Referring to the drawings FIG. 1 shows a source of electric power which is to be supplied to a load. For illustrative purposes this source is assumed to be a three-wire single-phase source capable of supplying power at a power frequency such as 60 Hz. This source includes two main conductors L1 and L2 which have an alternating voltage therebetween of the order of 480 volts. A ground conductor Lg also is shown. From this source, power is to be supplied to a load represented by load conductors L3 and L4 through a measuring device.

The measuring device includes a casing or enclosure 1 having two terminals 2 projecting therefrom for connection to the line conductors L1 and L2. These terminals may be in the form of contact blades which are received in contact jaws 2S located in a meter socket in a conventional manner. Similarly contact blades 3 project from the enclosure 1 for connection to the load conductors L3 and L4 through contact jaws 3S.

Within the enclosure 1 a watthour meter movement 4 is located. This meter movement includes current windings 5 connected between one of the contact blades 2 and one of the contact blades 3. Current windings 7 are connected between the remaining contact blades. The voltage winding 9 is connected across the contact blades 2. When energized from the line conductors L1 and L2 the windings develop a shifting magnetic field within which an electroconductive disc or armature 11 is mounted for rotation in a manner well known in the art.

In order to provide lightning or surge protection for the measuring device each of the contact blades 2 is connected to ground through a current limiter and a spark gap in series. Thus the left-hand contact blade 2 in FIG. 1 is connected to ground through a current limiter 13 and a spark gap 15. Similarly the remaining contact blade 2 is connected to ground through a current limiter 17 and a spark gap 19 in series. The current limiters 13 and 17 are mounted within the enclosure 1 whereas the spark gaps 15 and 19 are mounted on the outside of the enclosure 1.

As shown in FIGS. 2 and 3 the enclosure is formed by a cup-shaped glass cover 1c having its mouth or open end closed by a base 1b. Although the base may be constructed of metal with insulating bushings for the electroconductive members passing therethrough preferably the base is constructed of an insulating material such as a phenolic resin. If desired the enclosure may be completely sealed in the manner described in the Madden U.S. Pat. No. 2,320,946. Alternatively the enclosure may have openings establishing communication between the exterior and interior thereof. Desirably the enclosure may be sealed except for one or more openings which are closed by material MA capable of passing moisture while blocking particles above a certain size such as 100 microns. A construction of this type is shown in the Gill U.S. Pat. No. 3,337,802.

A grounded socket S comprising a cup-shaped electroconductive member S1 detachably receives the measuring device.

Each of the contact jaws 2s or 3s is secured to the base of the member S1 through an insulating block B. Sockets of this type are well known in the art.

The spark gap 15 includes a pair of electrodes 27 and 29 which are spaced to define a spark gap therebetween and a strip 61 which establishes a conductive path between the electrode 29 and the socket S. The components 27, 29, and 61 may be similar to those bearing the same reference characters in the aforesaid Schmidt et al. patent and may be similarly associated with the base. In the Schmidt et al. patent a liner 97 is provided for the base recess in which the electrodes are located. With the current limiter 13 here employed the liner 97 is shown but is not required and may be omitted if so desired.

The electrode 27 has a neck portion 53 which projects through the wall member 37 formed integrally with the base and through one end of a U-shaped electroconductive spring 33. The neck has its end upset to secure the electrode and the spring to the wall member.

The lead 5A which extends from the current windings 5 to the associated contact blade 2 is spaced from the free end of the U-shaped spring 33 and is of rigid construction. Conveniently the current limiter 13 may be inserted and compressed between the lead 5A and the free end of the spring 33 to be held in position by the resilience of the spring.

The current limiter 13 is designed to limit power-follow current which follows a breakover of the spark gap or discharge device 15 to a value which cannot injure the meter. In a preferred embodiment of the invention a block 13a of silicon carbide is employed. Such material has been employed heretofore in lightning arresters. As representative of suitable parameters the block 13a when utilized for a 480-volt meter may have a diameter of one-half inch and a length of 4/10 inch. To establish suitable electric contact with the block the ends of the block may be sprayed or coated with an electroconductive metallic powder applied by a Schoop gun. A pair of brass plates 13b and 13c then may be placed in contact with the coated ends of the block.

Preferably the silicon-carbide block is constructed to be immune to environmental conditions such as humidity. Ceramic binders for the silicon carbide which are immune to humidity are known in the art. The cylindrical periphery of the block also may be coated with a protective material 13d such as an epoxy resin. If desired the plates 13b and 13c may be provided with recesses for the purpose of receiving in nested relationship the lead 5A and the end of the spring 33 for the purpose of assuring proper positioning of the current limiter.

The current limiter 17 and the spark gap or discharge device 19 may be constructed in a manner similar to that discussed for the current limiter 13 and the spark gap or discharge device 15.

Tests have indicated the effectiveness of the invention. Thus in one test a meter similar to that herein described was connected to a 480 volts alternating current power source capable of supplying a bolted fault current of 6,000 amperes. A surge was then applied for the purposes of breaking over the spark gap or discharge device 15. The current limiter 13 restricted the current flow to a few amperes while limiting the voltage thereacross to a value insufficient to injure meter components. Repeated tests of this type were conducted without damage of any type to the components of the meter.

When the same test was applied to a meter in which the spring 33 was connected directly to the lead 5A with no current limiter in circuit with the spark gap or discharge device 15 the power-follow current resulting from a single surge was sufficient to burn off completely the strip 61.

Although the invention is particularly suitable for higher voltage meters such as those designed for 480-volt service the invention also can be applied advantageously to meters designed for lower voltages such as 120 volts. In one series of tests a meter designed in accordance with the foregoing description was connected to a single-phase 120-volt alternating-current circuit operating at 60 Hz. and capable of supply a bolted power-follow current of 3,560 amperes. When a surge was applied to break over the spark gap or discharge device 15 the silicon-carbide block limited the power-follow current to only a few amperes, and no damage to the meter resulted from repeated surges. When the spring 33 was connected directly to the lead 5A repeated surges seriously damaged the strip, although a single surge did not completely burn through the strip 61.

The location of the spark gap on the interior of the base 1b provides a unitary self-protected assembly wherein a protective barrier is interposed between the spark-gap discharge and the meter movement. At the same time the socket S provides a protective enclosure for the spark gap.

The location of the current limiter 13 within the enclosure 1 assures physical protection for the current limiter. The operation of the current limiter does not harm the meter movement.

FIGS. 4 and 5 disclose a preferred embodiment of the invention which is compact and low in cost.

The base 1B in FIG. 4 is generally similar to the previously described base 1b. A contact blade 2B is generally similar to the previously described contact blade 2. The contact blade 2B has fingers 101, 103 and a hole 105 which are similar to the fingers 49 and 51 and the hole 53 of the previously mentioned Gill patent. The fingers 101, 103 engage an electroconductive washer 107 located on the interior face of the base 1B and the hole 105 receives a cotter pin 109 adjacent the exterior face of the base 1B to retain the contact blade on the base in the manner discussed in the Gill patent.

The base 1B has a cylindrical pocket 111 adjacent to the contact blade 2B, the axis of the pocket being perpendicular to the plane of the base. This pocket receives the silicon-carbide block 13a and the brass plates 13b and 13c. The end wall of the pocket 111 is provided with a hole 113 having a diameter smaller than the diameter of the disc 13c.

In order to retain the block 13a and discs 13b, 13c in the pocket, the washer 107 has a spring extension 107A which overlies the disc 13b and biases the disc downwardly as viewed in FIG. 4. The spring extension also connects the disc 13b electrically to the contact blade 2B. The lead 5B corresponds to the lead 5A of FIGS. 1-3 and is electrically connected through the contact blade 2B, the washer 107 and the spring extension 107A to the disc 13b.

In FIG. 4 the end of the strip 61 projects over the hole 113 to form with the disc 13c a spark gap.

Conveniently the washer 107 and the spring extension 107A are cut from sheet electroconductive spring material such as stainless steel. The spring extension then is bent into the illustrated position.

In FIG. 4, the liner 97 and the electrodes 27, 29 of FIG. 3 may be employed. However they are not required and for optimum simplicity are omitted.

We claim:

1. A protected measuring device comprising an enclosure including a wall of insulating material with a pocket opening from the exterior face of the wall, an electroresponsive measuring unit located within the enclosure, electroconductive means extending between the exterior and the interior of the enclosure for establishing electric connections between the unit and an external circuit, a protective means for protecting the unit from the effects of electric surges, said protective means comprising an electric discharge device responsive to a substantial voltage thereacross for establishing an electric discharge to limit the voltage thereacross, said discharge device being located in said pocket and having a spring terminal accessible within said enclosure so as to establish discharge substantially externally of the enclosure, a current limiter connected in series with the discharge device to limit flow of current through the discharge device, said limiter being located substantially within said enclosure, and a current lead connected to said unit, said current limiter being compressed between said spring terminal and said current lead.

2. A measuring device as claimed in claim 1 wherein said enclosure includes a cup-shaped cover substantially concentric about an axis and a base of insulating material closing the open end of said cover, said spring terminal having a part deflectable against the resilience of the spring in a direction parallel to said axis, said unit having a portion spaced from said part in a direction parallel to said axis, said current limiter being located between the part and the portion and being proportioned to deflect the part of the spring terminal away from the position occupied by said part when the spring is unstressed.

3. A protected measuring device comprising an enclosure including a wall of insulating material with a pocket extending therethrough, an electroresponsive measuring unit located within the enclosure, electroconductive means extending between the exterior and the interior of the enclosure for establishing electric connections between the unit and an external circuit, a protective means for protecting the unit from the effects of electric surges, said protective means comprising an electric discharge device including a spark gap responsive to a substantial voltage thereacross for establishing an electric discharge to limit the voltage thereacross, a current limiter connected in series with the discharge device to limit flow of current through the discharge device, said limiter being located in said pocket so as to be substantially within said enclosure, and an electroconductive member located adjacent the exterior face of said wall to form said spark gap between such member and the current limiter and establish said discharge substantially externally of the enclosure.

4. A device as claimed in claim 3 wherein said electroconductive means comprises a contact blade extending through said wall, and means for retaining said contact blade comprising a resilient, electroconductive washer having a spring extension establishing an electrical connection between the contact blade and the current limiter and retaining said current limiter in said pocket.

* * * * *